United States Patent
Nuzzi et al.

(10) Patent No.: US 8,407,486 B2
(45) Date of Patent: Mar. 26, 2013

(54) SENDING AND RELEASING PENDING MESSAGES

(75) Inventors: Frank A. Nuzzi, Round Rock, TX (US); Donald H. Randall, Jr., Austin, TX (US); Michael Vinh Vu, Austin, TX (US); Michael John Weisskopf, Seabrook, TX (US)

(73) Assignee: International Business Machines Corporation, Armonk, NY (US)

( * ) Notice: Subject to any disclaimer, the term of this patent is extended or adjusted under 35 U.S.C. 154(b) by 1204 days.

(21) Appl. No.: 12/046,497

(22) Filed: Mar. 12, 2008

(65) Prior Publication Data

US 2009/0235332 A1    Sep. 17, 2009

(51) Int. Cl.
*G06F 11/30* (2006.01)

(52) U.S. Cl. ........ 713/193; 235/379; 713/182; 713/170; 379/88.13; 709/217; 725/31

(58) Field of Classification Search ............... 713/193
See application file for complete search history.

(56) References Cited

U.S. PATENT DOCUMENTS

| | | | | |
|---|---|---|---|---|
| 4,349,695 | A * | 9/1982 | Morgan et al. ............. | 713/170 |
| 5,710,889 | A * | 1/1998 | Clark et al. ............... | 235/379 |
| 6,442,600 | B1 * | 8/2002 | Anderson ................ | 709/217 |
| 7,139,800 | B2 | 11/2006 | Bellotti et al. | |
| 7,191,222 | B2 | 3/2007 | Quine | |
| 2002/0035597 | A1 | 3/2002 | Khodko et al. | |
| 2003/0009698 | A1 | 1/2003 | Lindeman et al. | |
| 2003/0095642 | A1 * | 5/2003 | Cloutier et al. ............ | 379/88.13 |
| 2004/0015554 | A1 | 1/2004 | Wilson | |
| 2004/0230642 | A1 | 11/2004 | Collet et al. | |
| 2005/0025291 | A1 * | 2/2005 | Peled et al. ................. | 379/88.13 |
| 2005/0053205 | A1 | 3/2005 | Hays | |
| 2005/0135681 | A1 | 6/2005 | Schirmer | |
| 2006/0086799 | A1 | 4/2006 | Robertson et al. | |
| 2006/0179157 | A1 | 8/2006 | Huang | |
| 2006/0180660 | A1 * | 8/2006 | Gray ............................. | 235/380 |
| 2006/0219776 | A1 * | 10/2006 | Finn ............................. | 235/380 |
| 2006/0294388 | A1 * | 12/2006 | Abraham et al. ............. | 713/182 |
| 2007/0064883 | A1 | 3/2007 | Rosenthal et al. | |
| 2007/0204348 | A1 * | 8/2007 | Matsuda et al. ............. | 726/26 |
| 2008/0059993 | A1 * | 3/2008 | Jia et al. ...................... | 725/31 |

* cited by examiner

*Primary Examiner* — Carl Colin
*Assistant Examiner* — S. Ali Zaidi
(74) *Attorney, Agent, or Firm* — Yee & Associates, P.C.; Yeen Tham

(57) ABSTRACT

Releasing pending messages is provided. An electronic message is received via a network from a sending client device. The electronic message includes a request to place the electronic message in a pending file and an authorization to release data. The electronic message is placed in the pending file and the authorization to release data is stored in a storage device. An authorization is received to release the electronic message from the pending file. Then, it is determined whether the authorization to release the electronic message matches the stored authorization to release data. In response to determining that a match is found, the electronic message is released from the pending file. Then, the released electronic message is sent to a receiving client device via the network.

10 Claims, 5 Drawing Sheets

SENDING AND RELEASING PENDING MESSAGES

BACKGROUND

1. Technical Field

Embodiments of the present invention relate generally to an improved data processing system. More specifically, embodiments of the present invention are directed to a computer-implemented method, apparatus, and computer usable program code for sending and releasing pending electronic messages.

2. Description of the Related Art

Today, most computers are connected to some type of network. A network allows a computer to share information with other computer systems. The Internet is one example of a computer network.

There is no doubt that the Internet has changed the way people and businesses communicate. For many people and businesses, electronic mail (e-mail) has virtually replaced traditional letters and even telephone calls as the preferred choice of correspondence. Every day, billions of e-mail messages are sent on the Internet. E-mail has been the most rapidly adopted form of communication ever known. In less than two decades, it has gone from obscurity to mainstream dominance.

In the fast-paced world of today, sometimes even the rapid response of e-mail is not fast enough. For that reason, instant messaging (IM) has gained popularity. IM may be implemented in various ways, but in general, it supports the sending and receiving of instant messages to and from other users. Instant messages are correspondence that appears on a computer display of a recipient more or less instantly after being sent. This is opposed to the more traditional e-mail messages, which typically are logged in the system until a recipient wishes to view them.

However, when sending a context sensitive message via either e-mail or IM, the sender may want the message to be viewed only after the sender authorizes release of the message. The sender may, for example, authorize release of the message only after the sender is certain that the receiver understands the context of the message prior to the receiver reading the message. Therefore, it would be beneficial to have a computer-implemented method, system, and computer usable program code for sending and releasing pending context sensitive electronic messages.

BRIEF SUMMARY

The illustrative embodiments described herein provide a computer-implemented method, apparatus, and computer usable program code for releasing pending messages. An electronic message is received via a network from a sending client device. The electronic message includes a request to place the electronic message in a pending file and an authorization to release data. The electronic message is placed in the pending file and the authorization to release data is stored in a storage device. An authorization is received to release the electronic message from the pending file. Then, it is determined whether the authorization to release the electronic message matches the stored authorization to release data. In response to determining that a match is found, the electronic message is released from the pending file. Then, the released electronic message is sent to a receiving client device via the network.

BRIEF DESCRIPTION OF THE DRAWINGS

The novel features believed characteristic of the illustrative embodiments are set forth in the appended claims. The illustrative embodiments, themselves, as well as a preferred mode of use and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 1:
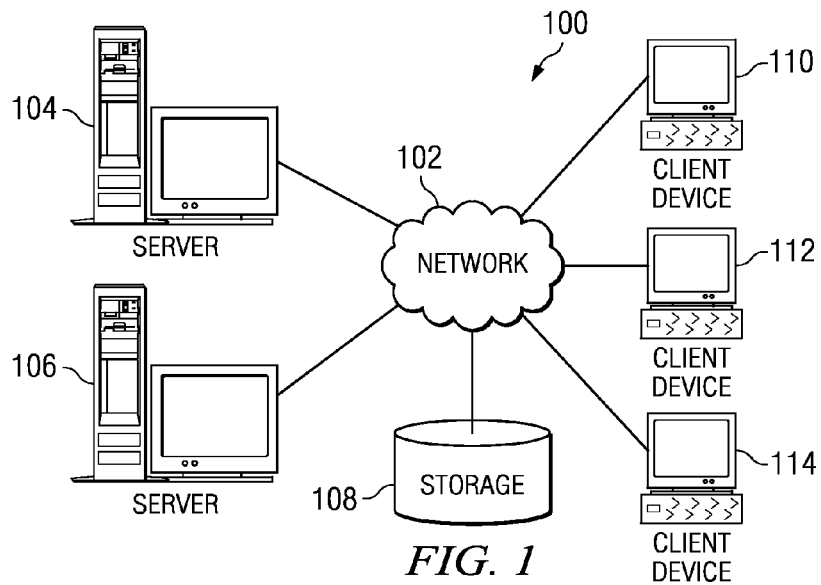
FIG. 1 is a pictorial representation of a network of data processing systems in which illustrative embodiments of the present invention may be implemented.
Figure 2:
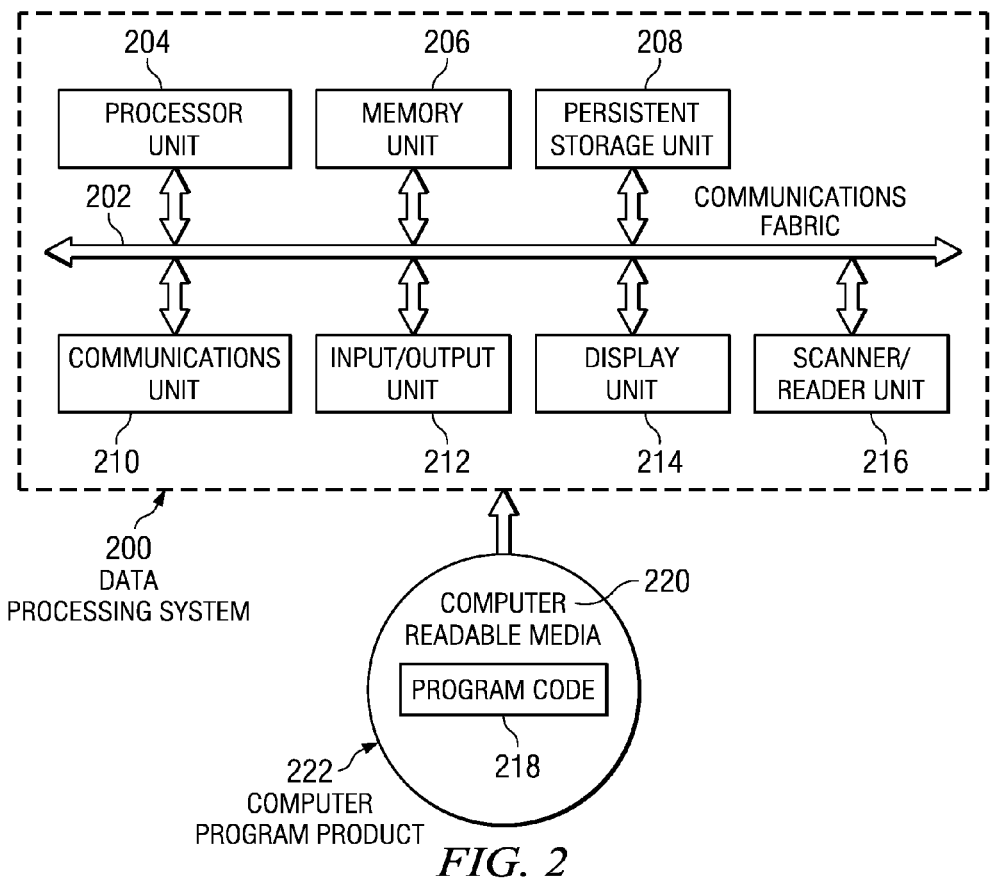
FIG. 2 is a block diagram of a data processing system in which illustrative embodiments of the present invention may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which different embodiments of the present invention may be implemented. Many modifications to the depicted environments may be made.

FIG. 1 depicts a pictorial representation of a network of data processing systems in which illustrative embodiments of the present invention may be implemented. Network data processing system 100 is a network of data processing systems, such as, for example, computers and other devices, in which the illustrative embodiments of the present invention may be implemented. Network data processing system 100 contains network 102, which is the medium used to provide communications links between the various devices connected together within network data processing system 100. Network 102 may include connections, such as wire, wireless communication links, or fiber optic cables.

In the depicted example, server 104 and server 106 connect to network 102 along with storage unit 108. Server 104 and server 106 may represent servers that provide electronic messaging services for network 102. In addition, server 104 and server 106 may represent a network of computers and other devices required to provide the electronic messaging services.

Storage 108 represents any type of storage device that is capable of storing data in a structured or unstructured format. Also, storage 108 may represent a plurality of storage units coupled to network 102. Storage 108 may, for example, be a database that stores user/customer data, contact lists, electronic messages, and authorization data, such as passwords, biometric data, radio frequency identification (RFID) data, and bar code data.

Further, client devices 110, 112, and 114 also connect to network 102. Client devices 110, 112, and 114 may be, for example, personal computers, laptop computers, handheld computers, personal digital assistants (PDAs), cellular telephones, gaming devices, or any combination thereof. Client devices 110, 112, and 114 are clients to server 104 and/or server 106 in this example. Server 104 and server 106 may provide data, such as boot files, operating system images, and applications to client devices 110, 112, and 114. Moreover, network data processing system 100 may include additional servers, clients, and other devices not shown.

Of course, network data processing system 100 may be implemented as a number of different types of networks, such as, for example, an intranet, a local area network (LAN), a wide area network (WAN), or the Internet. Also, is should be noted that FIG. 1 is only intended as an example and not as an architectural limitation for different illustrative embodiments of the present invention.

With reference now to FIG. 2, a block diagram of a data processing system is shown in which illustrative embodiments of the present invention may be implemented. Data processing system 200 is an example of a data processing system, such as server 104 or client device 110 in FIG. 1, in which computer usable program code or instructions implementing processes of illustrative embodiments of the present invention may be located. In this illustrative example, data processing system 200 includes communications fabric 202, which provides communications between processor unit 204, memory unit 206, persistent storage unit 208, communications unit 210, input/output (I/O) unit 212, display unit 214, and scanner/reader unit 216.

Processor unit 204 serves to execute instructions for software that may be loaded into memory unit 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory unit 206, in these examples, may be, for example, a random access memory (RAM) or any other suitable volatile or non-volatile storage device. Persistent storage unit 208 may take various forms depending on the particular implementation. For example, persistent storage unit 208 may contain one or more components or devices. For example, persistent storage unit 208 may be a disk drive, a flash memory, a rewritable optical disk, a rewritable magnetic tape, or some combination of the above. The media used by persistent storage unit 208 also may be removable. For example, a removable hard drive may be used for persistent storage unit 208. In addition, persistent storage unit 208 may represent a plurality of persistent storage units.

Communications unit 210, in these examples, provides for communications with other data processing systems or devices, such as, for example, server 106 and client device 112 in FIG. 1. In these examples, communications unit 210 is a network interface card. Communications unit 210 may provide communications through the use of either, or both, physical and wireless communications links.

Input/output unit 212 allows for input and output of data with other devices that may be connected to data processing system 200. For example, input/output unit 212 may provide a connection for user input through an alphanumeric keypad. Display unit 214 provides a mechanism to display information to a user of data processing system 200.

Scanner/reader 216 may, for example, be a biometric scanner, RFID reader, or a bar code scanner. Data processing system 200 uses scanner/reader unit 216 to obtain authorization data. The authorization data may, for example, be used to confirm user identity for authorizing the release of context sensitive electronic messages from a pending file. A biometric scanner may be used to obtain biometric information, such as, for example, signature data, retina data, facial data, fingerprint data, voice data, or any combination thereof, from a user or sender of an electronic message. The RFID reader may be used to obtain security information from an RFID tag embedded in, for example, a badge, or a letter. The bar code scanner may be used to obtain security information from a badge or card imprinted with a bar code.

Instructions for the operating system and applications or programs are located on persistent storage unit 208. The operating system may, for example, be a Linux® operating system. An application may, for example, be electronic messaging software.

The instructions for the operating system and applications or programs may be loaded into memory unit 206 for execution by processor unit 204. The processes of different embodiments of the present invention may be performed by processor unit 204 using computer-implemented instructions, which may be located in a memory, such as memory unit 206. These instructions are referred to as program code, computer usable program code, or computer readable program code that may be read and executed by a processor in processor unit 204. The program code in different illustrative embodiments of the present invention may be embodied on different physical or tangible computer readable media, such as memory unit 206 or persistent storage unit 208.

Program code 218 is located in a functional form on computer readable media 220 and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage unit 208 for transfer onto a storage device, such as a hard drive that is part of persistent storage unit 208. In a tangible form, computer readable media 220 also may take the form of a persistent storage, such as a hard drive or a flash memory that is connected to data processing system 200. The tangible form of computer readable media 220 is also referred to as computer recordable storage media.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different illustrative embodiments of the present invention may be implemented. The different illustrative embodiments of the present invention may be implemented in a data processing system including components in addition to, or in place of, those illustrated for data processing system 200. Other components shown in FIG. 2 may be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory unit 206 or a cache, such as found in an interface and memory controller hub, which may be present in communications fabric 202.

Illustrative embodiments provide a computer implemented method, system, and computer usable program code for sending and releasing pending context sensitive electronic messages. A messaging server receives a context sensitive electronic message via a network from a sending client device. The electronic message, which may be an e-mail or an instant message, includes a request to place the electronic message in a pending file and authorization to release data.

The messaging server places the electronic message in the pending file and stores the authorization to release data in a storage device, such as a database. Afterward, the messaging server receives an authorization from the message sender to release the electronic message from the pending file. Then, the messaging server compares the received authorization to release the electronic message with the stored authorization to release data.

If the messaging server determines that a match is found between the received authorization and the stored authorization to release data, then the messaging server releases the electronic message from the pending file and sends the released electronic message to a receiving client device via the network. If the messaging server determines that a match is not found, the messaging server does not release the electronic message for transmission and sends a notification message to the sender of the electronic message that the authorization was invalid.

Thus, illustrative embodiments of the present invention allow a sender of an electronic message, which is context sensitive, to send the message to one or more recipients with restrictions. In other words, the message is placed in a pending state before being sent to the one or more recipients. Once the sender authenticates the message, the message is released for transmission.

The message sender composes the context sensitive electronic message and then sends it to the messaging server with a request to place the message in "pending". Illustrative embodiments of the present invention provide several authorization options to release the pending message. For example, the sender may release the message from the pending file in a messaging service server by providing the appropriate authorization data, such as biometric data, RFID data, bar code data, and/or a password. In addition, the sender may authorize the release of the electronic message by making a telephone call to, or from, a specified telephone number, and inputting a specific voice and/or keypad command.

In an alternative illustrative embodiment of the present invention, only a specified individual, such as a manager or human resource representative, may authorize the release of the message. Alternatively, each of a plurality of individuals, such as a general manager, department manager, direct supervisor, and human resource representative, must separately authorize the release of the message to the intended recipient(s) prior to the message being released for transmission.

Further, illustrative embodiments of the present invention provide the ability to expire the message. In other words, the message may be destroyed if the message is not released after a configurable predetermined period of time elapses. Configurable means that the message sender has the option to determine the period of time. The predetermined period of time may, for example, be one hour, one day, one week, or one month. However, it should be noted that any period of time may be defined by the user. Alternatively, a default period of time may be used if the user does not select one.

In another alternative embodiment of the present invention, the messaging service server may send a notification to the receiving client device that contains instruction on how the recipient may receive the released message. For example, if the message is to be released by a telephone call, then the notification message may instruct the recipient(s) that the pending message may be received after calling a specified telephone number, such as 1-888-555-5555, or the pending message may be received after calling from a specified number, such as 555-555-5555. Also, the recipient(s) after calling the specified telephone number may be required to listen to a pre-recorded message that explains the context of the electronic message. Furthermore, the recipient(s) may be instructed to input one or more specific voice and/or keypad commands to acknowledge that the context of the electronic message was understood by the recipient(s) prior to receiving the electronic message. Moreover, the messaging service server may record this acknowledgement by the recipient(s) for future reference by the message sender. The emphasis in this illustrative embodiment of the present invention is the notification of the intended recipient(s) about what action needs to be taken in order to receive the message.

Figure 3:
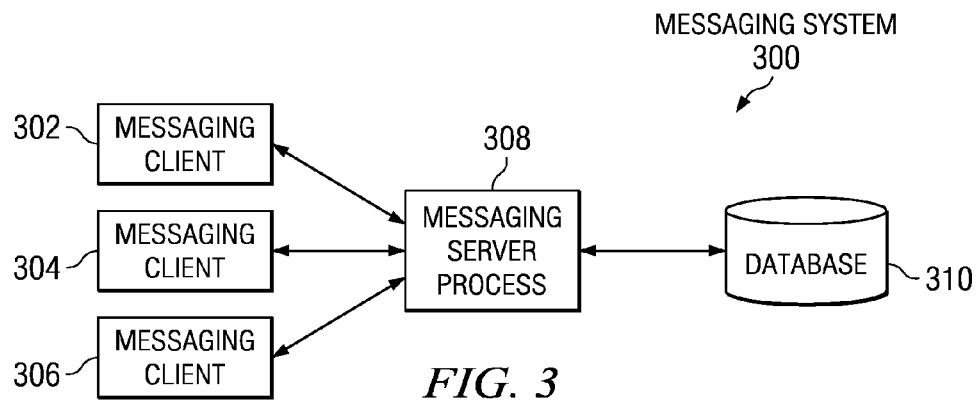
FIG. 3 is a block diagram illustrating components used in managing electronic messages in accordance with an illustrative embodiment of the present invention.

With reference now to FIG. 3, a block diagram illustrating components used in managing electronic messages is depicted in accordance with an illustrative embodiment of the present invention. Messaging system 300 includes messaging client 302, messaging client 304, messaging client 306, messaging server process 308, and database 310. However, it should be noted that FIG. 3 is only meant as an exemplary illustration and is not intended as a restriction on illustrative embodiments of the present invention. In other words, messaging system 300 may include more or fewer components, such as servers, clients, databases, and other devices, as needed.

Messaging clients 302, 304, and 306 may, for example, be client devices 110, 112, and 114 in FIG. 1. In addition, messaging clients 302, 304, and 306 may, for example, be implemented in data processing system 200 in FIG. 2. Also, messaging clients 302, 304, and 306 may, for example, be computers, PDAs, cellular telephones, or gaming devices.

In this illustrative example, a user utilizing messaging client 302 may send or exchange electronic messages over a network with other users using messaging clients 304 and 306. The exchange of electronic messages may, for example, be via e-mail, IM, broadcast messaging, or any other synchronous or asynchronous messaging system that may be utilized by illustrative embodiments of the present invention.

Further, the exchange of electronic messages within messaging system 300 is facilitated through messaging server process 308. Messaging server process 308 may, for example, be server 106 in FIG. 1. Messaging server process 308 may store context sensitive electronic messages in a pending file, if requested to do so. Moreover, messaging server process 308 may store authentication data associated with each of the context sensitive electronic messages. Messaging server process 308 may store the pending file and the authentication data in, for example, database 310. Database 310 may, for example, be storage 108 in FIG. 1.

Figure 4:
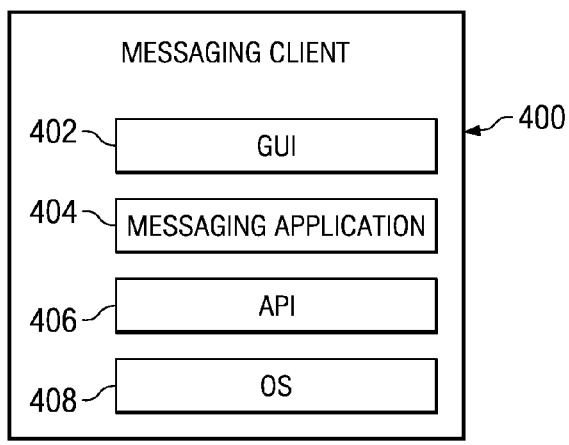
FIG. 4 is a block diagram illustrating components of a messaging client in accordance with an illustrative embodiment of the present invention.

With reference now to FIG. 4, a block diagram illustrating components of a messaging client is depicted in accordance with an illustrative embodiment of the present invention. Messaging client 400 may, for example, be messaging client 302 in FIG. 3. Messaging client 400 includes graphical user interface (GUI) 402, messaging application 404, application programming interface (API) 406, and operating system (OS) 408.

A user of messaging client 400 utilizes GUI 402 to interact with the applications residing in messaging client 400, such as messaging application 404. The user utilizes messaging application 404 to connect to and access a messaging server, such as messaging server process 308 in FIG. 3, via a network. Messaging application 404 may, for example, be any IM or e-mail software that may be utilized by illustrative embodiments of the present invention.

API 406 allows the user of messaging client 400, which may be an individual or a software routine, to invoke system capabilities using a standard consistent interface without concern for how the particular functionality is implemented. Messaging application 404 may, for example, run on OS 408. OS 408 is utilized to provide high-level functionality to the user and to other software. OS 408 and messaging application 404 may employ user input devices in order to obtain input from the user. User input devices may, for example, be used to set user preferences.

A processor, such as processor unit 204 in FIG. 2, performs the basic operations in messaging client 400. The processor may, for example, display information on GUI 402. GUI 402 has a plurality of picture elements, collectively referred to as a screen, which may define the appearance of a user interface environment displayed on GUI 402. GUI 402 screen contents and, therefore, the appearance of the user interface environment, may be controlled or altered by messaging application 404 or OS 408 either individually or in combination.

Figure 5:
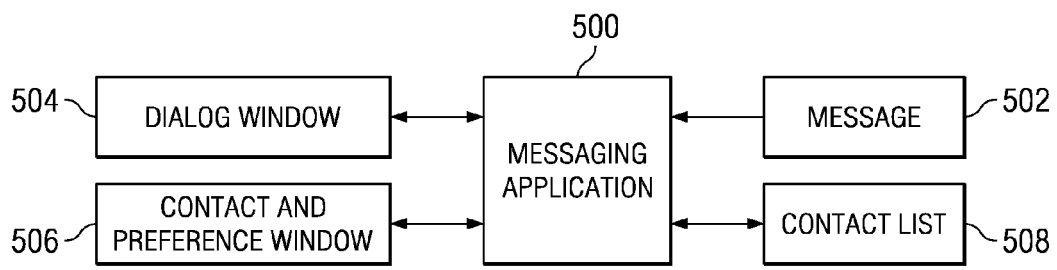
FIG. 5 is a block diagram illustrating a messaging application in accordance with an illustrative embodiment of the present invention.

With reference now to FIG. 5, a block diagram illustrating a messaging application is depicted in accordance with an illustrative embodiment of the present invention. The components shown in FIG. 5 may, for example, be found in messaging application 404 in FIG. 4. Also, these components may, for example, be implemented in data processing system 200 in FIG. 2.

Messaging application 500 processes electronic messages, such as message 502. As messaging application 500 receives these electronic messages, messaging application 500 displays these received messages in dialog window 504. Additionally, dialog window 504 provides an interface for a user to input text in order to draft and send messages to other users.

Messaging application 500 presents contact and preference window 506 to provide the user with a contact list of user names, as well as other information. Contact and preference window 506 also provides an interface to allow the user to set different preferences. For example, the user may set passwords required to authorize the release of context sensitive electronic messages in a pending file. Alternatively, the user may set a preference to use biometric data, RFID data, or bar code data to authorize the release of pending electronic messages. Further, the user may use contact and preference window 506 to set other preferences, such as sending alert notifications to the message sender and/or message recipient regarding message delivery.

In addition, contact and preference window 506 stores in contact list 508 a list of names presented by contact and preference window 506 in these examples. The user may edit contact list 508 by adding to or delete from contact list 508 other users. Contact list 508 is utilized for presenting the list of names within contact and preference window 506.

Figure 6:
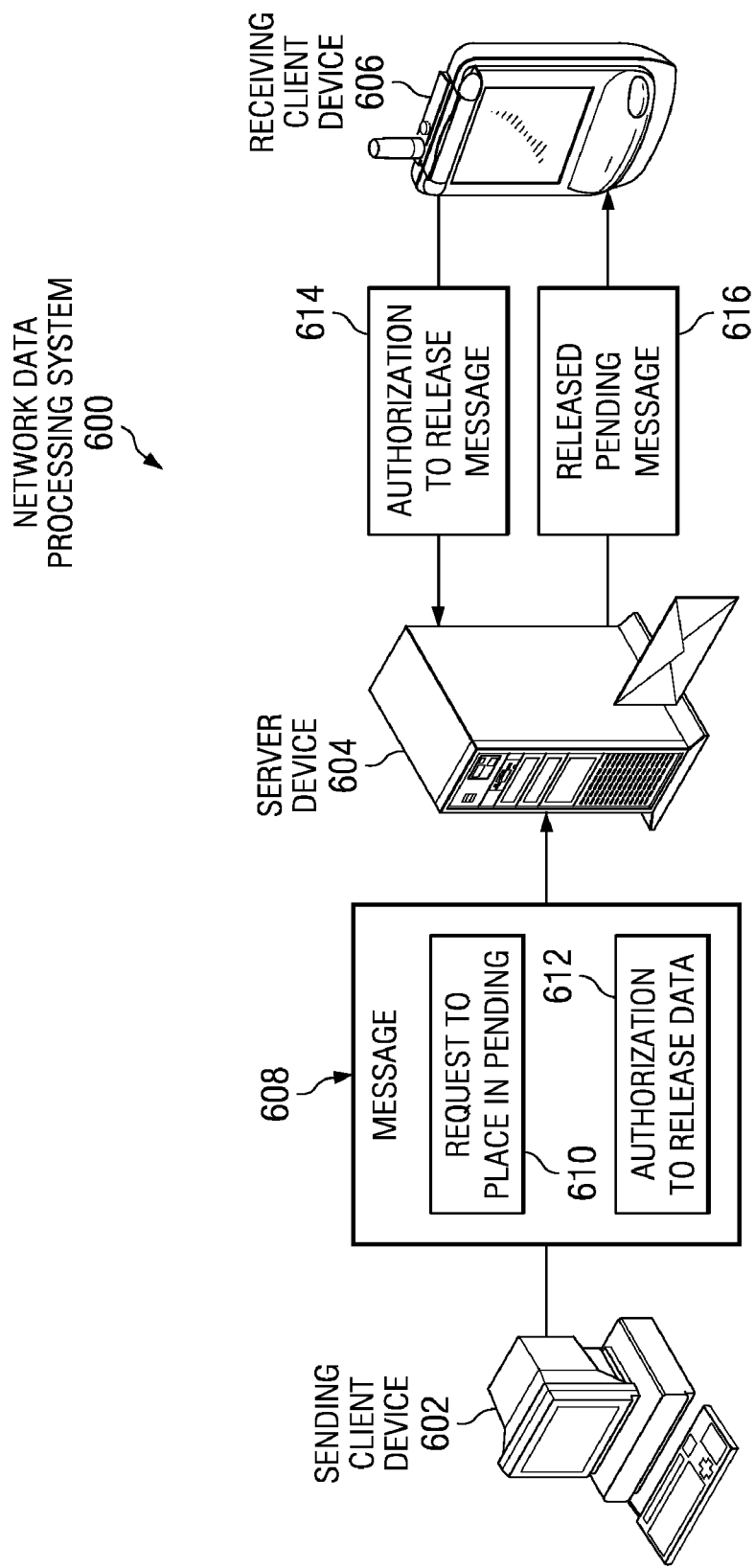
FIG. 6 is an exemplary illustration of a system for sending and releasing pending electronic messages in accordance with an illustrative embodiment of the present invention.

With reference now to FIG. 6, an exemplary illustration of a system for sending and releasing pending electronic messages is depicted in accordance with an illustrative embodiment of the present invention. Network data processing system 600 may, for example, be network data processing system 100 in FIG. 1. Network data processing system 600 is a network of data processing systems that a user may use to send context sensitive electronic messages to a pending file and then authorize the release of those pending messages for transmission to the intended recipients.

Network data processing system 600 includes sending client device 602, server device 604, and receiving client device 606. A user utilizes sending client device 602 to create a context sensitive electronic message, such as message 608, by using a messaging application, such as messaging application 404 in FIG. 4. Message 608 may, for example, be an e-mail, an instant message, a broadcast message, or any other type of synchronous or asynchronous form of electronic message.

Message 608 includes request to place in pending 610 and authorization to release data 612. The messaging application may, for example, locate request to place in pending 610 and authorization to release data 612 in a header of an e-mail message. However, illustrative embodiments of the present invention are not limited to such. Illustrative embodiments may insert request to place in pending 610 and authorization to release data 612 in any portion of message 608 that is appropriate for the system of electronic transmission of message 608. Alternatively, illustrative embodiments of the present invention may transmit request to place in pending 610 and authorization to release data 612 separately.

Request to place in pending 610 is a request to place message 608 in a pending file. This pending file is a memory location in a storage device, such as memory unit 206 or persistent storage unit 208 in FIG. 2. The pending file may be located in a server, such as server device 604, or in a client, such as sending client device 602.

Authorization to release data 612 is data required to release message 608 from the pending file. Authorization to release data 612 may, for example, be a password, biometric data, such as a fingerprint, RFID data, or bar code data. Authorization to release data 612 may, for example, be obtained from a message sender via a keyboard, a keypad, a mouse, a microphone, a cell phone, a scanner/reader unit, such as scanner reader unit 216 in FIG. 2, or any combination thereof.

Server device 604 is a messaging service server. Server device 604 receives message 608 from sending client device 602. Because message 608 includes request to place in pending 610, server device 604 places message 608 in a pending file. Alternatively, server device 604 may store message 608 in a separate storage device, such as storage 108 in FIG. 1. In addition, server device 604 stores authorization to release data 612.

The intended recipient(s) of message 608 may use receiving client device 606 to receive the pending context sensitive electronic message from server device 604. However, authorization to release message 614 must first be received by server device 604 prior to the release of message 608 from the pending file. Authorization to release message 614 may, for example, be sent from receiving client device 606, sending client device 602, or from any other device connected to network data processing system 600. Authorization to release message 614 includes the required authorization data to release message 608 from pending.

Subsequent to receiving authorization to release message 614 and confirming that the authorization data contained in authorization to release message 614 is the correct or valid authorization for message 608, server device 604 releases message 608 for transmission and sends released pending message 616 to receiving client device 606. Released pending message 616 is message 608, which has been released for transmission.

However, it should be noted that in an alternative illustrative embodiment of the present invention, server device 604 may send a notification to receiving client device 606 with specific instructions on how to receive released pending message 616. In other words, server device 604 does not immediately send released pending message 616 to receiving client device 606 until after the intended recipient(s) successfully complete the instructions contained within the notification message. Moreover, message 608 may be encrypted with an encryption key that requires the decryption key to be provided to receiving client device 606 prior to viewing message 608. Also, it should be noted that server device 604 may destroy message 608 or released pending message 616 if the intended recipient(s) do not receive the message prior to the passage of a configurable period of time, such as, for example, twenty-four hours.

Figure 7:
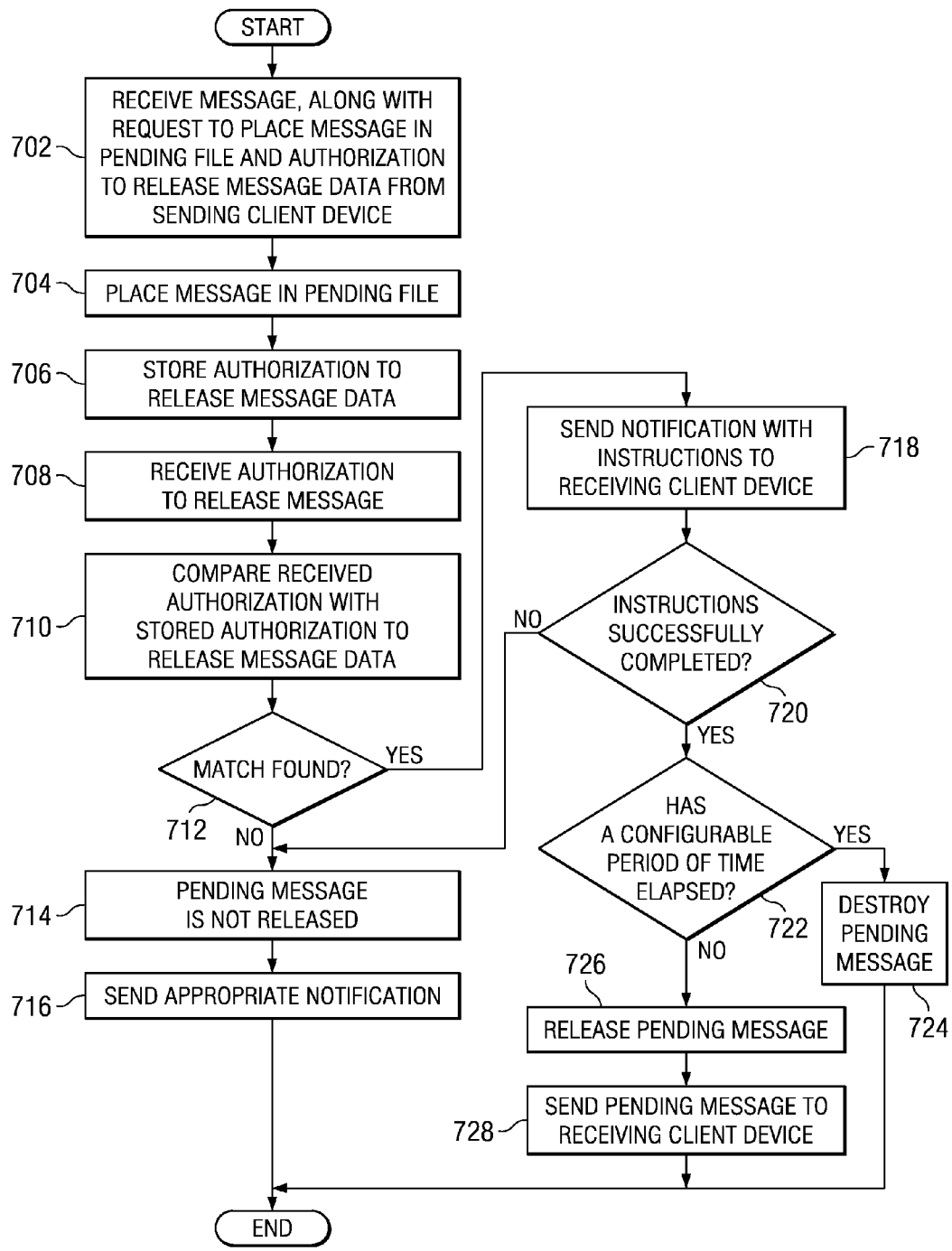
FIG. 7 is a flowchart illustrating an exemplary process for receiving and releasing pending electronic messages in accordance with an illustrative embodiment of the present invention.

With reference now to FIG. 7, a flowchart illustrating an exemplary process for receiving and releasing pending electronic messages is shown in accordance with an illustrative embodiment of the present invention. The process depicted in FIG. 7 may be implemented, for example, in a server, such as server device 604 in FIG. 6.

The process begins when the server receives a message, which includes a request to place the message in a pending file and authorization to release message data, from a client, such as sending client device 602 in FIG. 6 (process block 702). The message, which includes the request to place the message in pending and the authorization to release message data may, for example, be message 608 that includes request to place in pending 610, and authorization to release data 612 in FIG. 6.

After receiving the message in process block 702, the server places the message in a pending file (process block 704) and stores the authorization to release message data (process block 706). Subsequently, the server receives an authorization to release the message from the pending file, such as authorization to release message 614 in FIG. 6 (process block 708). Then, the server compares the received authorization data with the stored authorization to release message data (process block 710).

The server then makes a determination as to whether a match is found between the received authorization data and the stored authorization to release message data (process block 712). If a match is not found, no output of process block 712, then the server does not release the pending message for transmission (process block 714) and the server sends an appropriate notification to the sender that the authentication data was invalid (process block 716). The process terminates thereafter.

If a match is found, yes output of process block 712, then the server sends a notification to a receiving client, such as receiving client device 606 in FIG. 6, with instruction on how to receive the released pending message (process block 718). Then, the server makes a determination as to whether the instructions contained in the notification were successfully completed (process block 720). If the instructions are not successfully completed, no output of process block 720, then the process returns to process blocks 714 and 716 where the server does not release the pending message and sends an appropriate message to the intended recipient(s) that the instructions were not successfully completed.

If the instructions are successfully completed, yes output of process block 720, then the server makes a determination as to whether a configurable period of time has elapsed (process block 722). If the configurable period of time has elapsed, yes output of process block 722, then the server destroys the pending message (process block 724). The process terminates thereafter.

If the configurable period of time has not elapsed, no output of process block 722, then the server releases the pending message for transmission (process block 726). Afterward, the server sends the released pending message to the receiving client device (process block 728). The process terminates thereafter. It should be appreciated by those of ordinary skill in the art that even though the process blocks are shown in a sequential order, illustrative embodiments of the present invention are not restricted to such. In other words, one or more process blocks may occur concurrently with one or more other process blocks.

Figure 8:
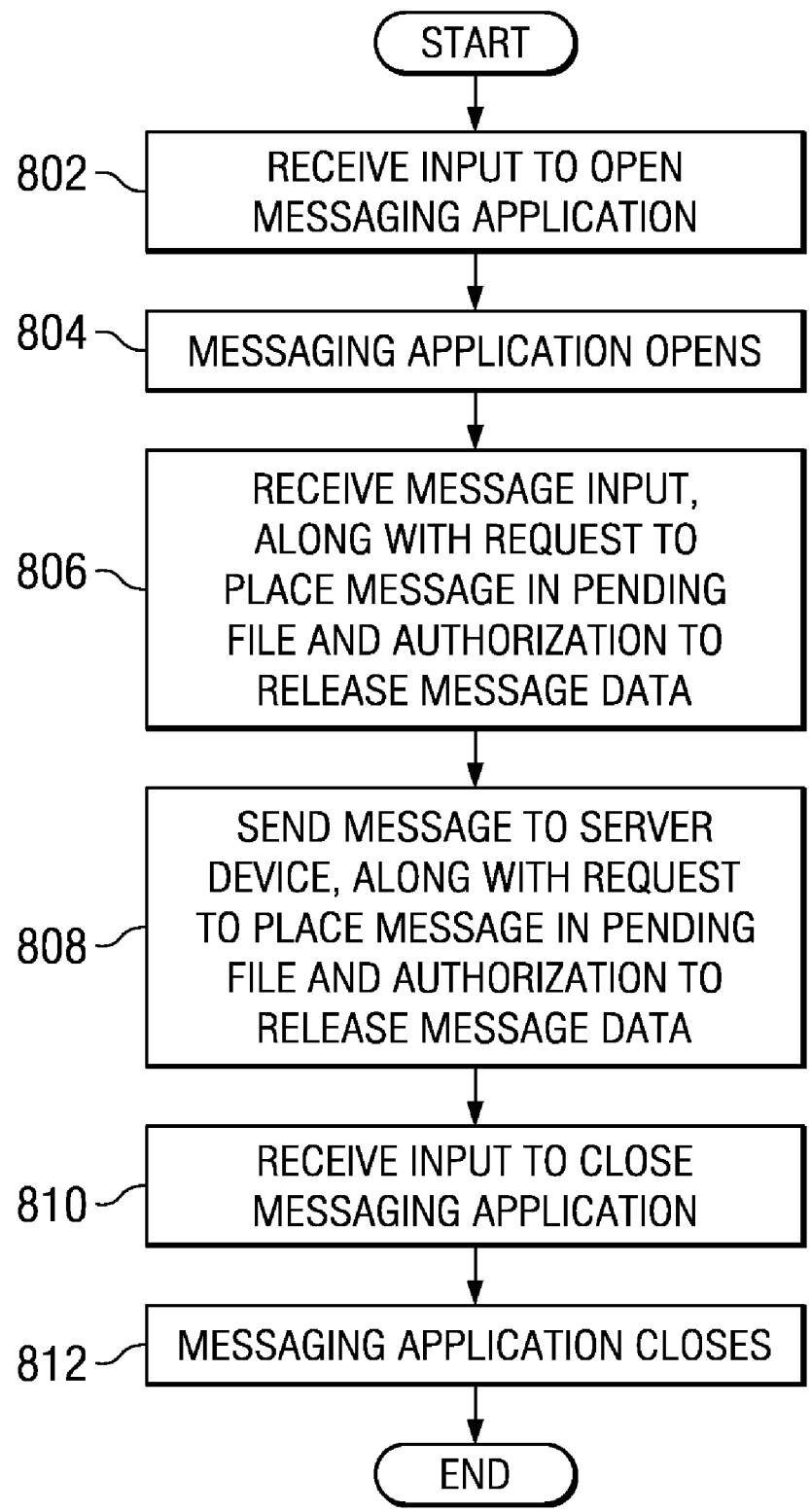
FIG. 8 is a flowchart illustrating an exemplary process for sending a context sensitive electronic message to a pending file in accordance with an illustrative embodiment of the present invention.

With reference now to FIG. 8, a flowchart illustrating an exemplary process for sending a context sensitive electronic message to a pending file is shown in accordance with an illustrative embodiment of the present invention. The process depicted in FIG. 8 may be implemented, for example, in a client, such as sending client device 602 in FIG. 6.

The process begins when the client receives an input to open a messaging application, such as messaging application 404 in FIG. 4 (process block 802). Then, the client opens the messaging application (process block 804). Subsequently, the messaging application receives message input, along with a request to place the message in a pending file and authorization to release message data (process block 806).

Afterward, the client sends the message to a server, such as server device 604 in FIG. 6, along with the request to place the message in the pending file and the authorization to release message data, in response to a user input to send the message (process block 808). Subsequently, the client receives an input to close the messaging application (process block 810). Then, the client closes the messaging application (process block 812). The process terminates thereafter.

Thus, illustrative embodiments of the present invention provide a computer-implemented method, apparatus, and computer usable program code for sending and releasing context sensitive pending messages. Illustrative embodiments of the present invention may be implemented entirely in hardware, entirely in software or using a combination of both hardware and software elements. In one embodiment, the invention is implemented in software, including but not limited to firmware, resident software, microcode, or the like.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a RAM, a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a communication medium (e.g., a system bus). The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention embodiments in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer-implemented method for releasing pending messages, the computer-implemented method comprising:
    receiving, by a server device, from a sending client device via a network an electronic message that includes in a header of the electronic message request data used for placing the electronic message in a pending file and authorization data used for releasing the electronic message from the pending file;
    placing, by the server device, the electronic message in the pending file based on the request data included in the header of the electronic message;
    storing, by the server device, the authorization data included in the header of the electronic message in a storage device to form stored authorization data;
    receiving, by the server device, an authorization to release the electronic message from the pending file, wherein the authorization to release the electronic message from the pending file is radio frequency identification data received from the sending client device using a radio frequency identification reader located within the sending client device to obtain the radio frequency identification data;
    determining, by the server device, whether the authorization to release the electronic message matches the stored authorization data;
    responsive to a determination that a match is found, sending, by the server device, a notification to an intended recipient of the electronic message with instructions on how to receive the electronic message, wherein the instructions direct the intended recipient to call a specified telephone number, listen to a pre-recorded message regarding a context of the electronic message, and acknowledge that the context of the electronic message is understood by inputting a specified voice command input, and wherein acknowledgment that the context of the electronic message was understood is recorded by the server device;
    determining, by the server device, whether a configurable period of time has elapsed;
    responsive to a determination that the configurable period of time has elapsed, destroying, by the server device, the electronic message;
    responsive to a determination that the configurable period of time has not elapsed, releasing, by the server device, the electronic message from the pending file to form a released electronic message; and
    sending, by the server device, the released electronic message to a receiving client device via the network.

2. The computer-implemented method of claim 1, further comprising:
    responsive to a determination that the authorization to release the electronic message and the stored authorization data do not match, sending, by the server device, a notification to a sender of the electronic message that an invalid authorization to release the electronic message has been received.

3. The computer-implemented method of claim 1, further comprising:
    determining whether the instructions are successfully completed prior to sending the released electronic message to the intended recipient.

4. The computer-implemented method of claim 1, wherein the electronic message is an e-mail.

5. The computer-implemented method of claim 1, wherein the electronic message is an instant message.

6. The computer-implemented method of claim 1, wherein the electronic message is encrypted with an encryption key, and wherein a decryption key is required in the receiving client device to view the released electronic message.

7. A data processing system for releasing pending messages, the data processing system comprising:
    a bus system;
    a storage device connected to the bus system, wherein the storage device stores a set of instructions; and
    a processing unit connected to the bus system, wherein the processing unit executes the set of instructions to:
        receive from a sending client device via a network an electronic message that includes in a header of the electronic message request data used for placing the electronic message in a pending file and authorization data used for releasing the electronic message from the pending file;
        place the electronic message in the pending file based on the request data included in the header of the electronic message;
        store the authorization data included in the header of the electronic message in the storage device to form stored authorization data;
        receive an authorization to release the electronic message from the pending file, wherein the authorization to release the electronic message from the pending file is radio frequency identification data received from the sending client device using a radio frequency identification reader located within the sending client device to obtain the radio frequency identification data;
        determine whether the authorization to release the electronic message matches the stored authorization data;
        send a notification to an intended recipient of the electronic message with instructions on how to receive the electronic message in response to a determination that a match is found, wherein the instructions direct the intended recipient to call a specified telephone number, listen to a pre-recorded message regarding a context of the electronic message, and acknowledge that the context of the electronic message is understood by inputting a specified voice command input, and wherein acknowledgment that the context of the electronic message was understood is recorded by the data processing system;

determine whether a configurable period of time has elapsed;

destroy the electronic message in response to a determination that the configurable period of time has elapsed;

release the electronic message from the pending file to form a released electronic message in response to a determination that-the configurable period of time has not elapsed; and send the released electronic message to a receiving client device via the network.

8. A computer program product for releasing pending messages, the computer program product comprising:

a computer readable storage device having computer usable program code embodied therein, the computer readable storage device comprising:

computer usable program code for receiving from a sending client device via a network an electronic message that includes in a header of the electronic message request data used for placing the electronic message in a pending file and authorization data used for releasing the electronic message from the pending file;

computer usable program code for placing the electronic message in the pending file based on the request data included in the header of the electronic message;

computer usable program code for storing the authorization data included in the header of the electronic message in a storage device to form stored authorization data;

computer usable program code for receiving an authorization to release the electronic message from the pending file, wherein the authorization to release the electronic message from the pending file is radio frequency identification data received from the sending client device using a radio frequency identification reader located within the sending client device to obtain the radio frequency identification data;

computer usable program code for determining whether the authorization to release the electronic message matches the stored authorization data;

computer usable program code for sending a notification to an intended recipient of the electronic message with instructions on how to receive the electronic message in response to a determination that a match is found, wherein the instructions direct the intended recipient to call a specified telephone number, listen to a pre-recorded message regarding a context of the electronic message, and acknowledge that the context of the electronic message is understood by inputting a specified voice command input, and wherein acknowledgment that the context of the electronic message was understood is recorded by a server device;

computer usable program code for determining whether a configurable period of time has elapsed;

computer usable program code for destroying the electronic message in response to a determination that the configurable period of time has elapsed;

computer usable program code for releasing the electronic message from the pending file to form a released electronic message in response to a determination that the configurable period of time has not elapsed; and computer usable program code for sending the released electronic message to a receiving client device via the network.

9. The computer program product of claim 8, further comprising:

computer usable program code for sending a notification to a sender of the electronic message that an invalid authorization to release the electronic message has been received in response to a determination that the authorization to release the electronic message and the stored authorization data do not match.

10. The computer program product of claim 8, further comprising:

computer usable program code for determining whether the instructions are successfully completed prior to sending the released electronic message to the intended recipient.

* * * * *